(12) United States Patent
Neri

(10) Patent No.: US 6,584,754 B1
(45) Date of Patent: Jul. 1, 2003

(54) MACHINE FOR ORDERING AND FEEDING BUNDLES OF SHEETS TO A UNIT FOR THE ASSEMBLY OF BUNDLES IN GROUPS

(75) Inventor: Armando Neri, Bologna (IT)

(73) Assignee: Currency Systems International, Irving, TX (US)

( * ) Notice: Subject to any disclaimer, the term of this patent is extended or adjusted under 35 U.S.C. 154(b) by 241 days.

(21) Appl. No.: 09/698,158

(22) Filed: Oct. 30, 2000

(30) Foreign Application Priority Data

Nov. 2, 1999 (IT) .......................................... BO99A0585

(51) Int. Cl.[7] .............................................. B65B 35/30
(52) U.S. Cl. ............................... 53/540; 53/541; 53/544
(58) Field of Search ........................ 53/540, 541, 543, 53/544, 399

(56) References Cited

U.S. PATENT DOCUMENTS

| | | |
|---|---|---|
| 4,283,902 A | 8/1981 | Giori |
| 4,481,751 A * | 11/1984 | Ujhelyi ........................ 53/541 |
| 5,353,576 A * | 10/1994 | Palamides et al. ............ 53/540 |
| 5,590,507 A | 1/1997 | Wyssmann |

FOREIGN PATENT DOCUMENTS

| | | |
|---|---|---|
| AT | 343 150 | 5/1978 |
| DE | 29 35 263 | 3/1980 |
| EP | 0 248 307 | 12/1987 |
| EP | 0 286 317 | 10/1988 |
| EP | 0 885 826 | 12/1998 |
| GB | 2 262 729 | 6/1993 |

* cited by examiner

*Primary Examiner*—Eugene Kim
*Assistant Examiner*—Sameh Tawfik
(74) *Attorney, Agent, or Firm*—Colin P. Cahoon; Carstens, Yee & Cahoon, LLP

(57) ABSTRACT

Banknotes are processed using a machine equipped with a number of modules by which predetermined numbers of notes are ordered in bundles secured with at least one band and then transferred to a unit to be strapped in groups; an intermittently driven conveyor equipped with pockets operates in conjunction with the modules to direct the bundles in a predetermined succession, according to a previously established sequence, toward a stacker located at an outfeed end of the conveyor. The bundles are stacked in set numbers to form groups in which the predetermined succession is maintained as the single bundles pass along a stacking axis, preserving an initial sequence of code and serial number with which the banknotes are fed initially into the bundling modules.

14 Claims, 4 Drawing Sheets

MACHINE FOR ORDERING AND FEEDING BUNDLES OF SHEETS TO A UNIT FOR THE ASSEMBLY OF BUNDLES IN GROUPS

BACKGROUND OF THE INVENTION

The present invention relates to a machine by which bundles of sheets, in particular banknotes, are ordered and fed to a unit for the assembly of the bundles in groups.

The invention finds application to advantage in machines by which banknotes are ordered and wrapped in bundles, and thereafter in groups of bundles; indeed reference is made directly to this same art field in the following specification albeit with no limitation in scope implied.

The prior art affords currency processing systems equipped with a plurality of modules through which banknotes received from a fitness checking unit are fed in succession and bundled; the single notes are supplied to each module from the checking unit in a sequence determined by code and serial number.

Bundles consisting in a predetermined number of banknotes are formed in each of the modules and fed gradually toward a relative outlet, where a stack is formed. The stacks of bundles are then taken up cyclically and randomly by one or more pickup and transfer devices, on receipt of a control signal from sensors located at each outlet, and directed toward a further machine unit.

Whilst the machines outlined above are effective enough in forming and transferring the stacks of bundles, they are unable to maintain the initial infeed sequence of code and serial number when the bundles of notes are assembled subsequently into groups. In other words, the numerical progression is abandoned both during throughput of the single stacks and at the stage where the stacks are taken up by the pickup and transfer means.

The object of the invention is to set forth a machine for ordering and feeding groups of bundled banknotes to a strapper/bander unit, such as will overcome the aforementioned drawback while allowing the assembly of the bundles into ordered groups.

SUMMARY OF THE INVENTION

The stated object is realized according to the invention in a machine for ordering and feeding bundles of sheets, in particular banknotes, to a unit by which the bundles are strapped in groups.

Such a machine will comprise at least one module for the formation of bundles consisting each in a predetermined number of banknotes secured by at least one band, also a receiving conveyor by which the bundles emerging from the module are fed in a predetermined succession toward a stacker located at an outfeed end of the conveyor and serving to place a predetermined number of bundles one on top of another in such a manner as to assemble groups in which the predetermined succession is maintained as the bundles advance along a respective stacking axis.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
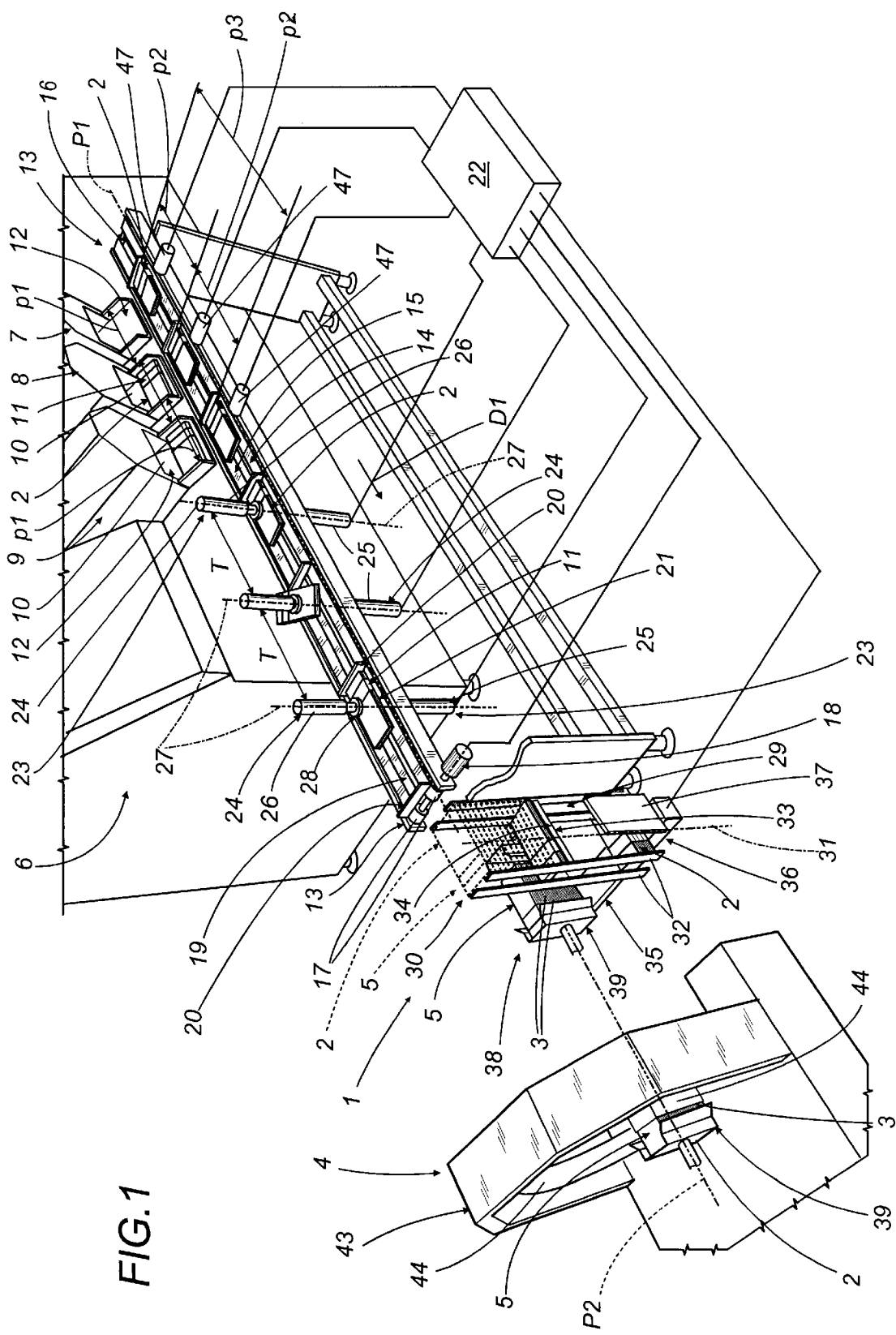
FIG. 1 illustrates a machine embodied according to the present invention, seen schematically and in perspective, associated with a system for checking and feeding banknotes.

Referring to FIG. 1 of the drawings, 1 denotes a machine, considered in its entirety, for ordering and feeding bundles 2 of banknotes 3 to a unit 4 by which the bundles 2 are then strapped or banded in groups 5. The machine 1 is associated on the infeed side with a system 6 comprising a plurality of conventional bundling modules, by which the single banknotes 3 are checked initially as being fit for use and then fed through a banding mechanism; three modules are indicated in the example of FIG. 1, denoted 7, 8 and 9 respectively viewing from right to left.

Each such module 7, 8 and 9 is in receipt of a succession of banknotes 3 arranged in order of code and serial number and directed along a formation channel 10; once the single notes have accumulated to a predetermined number, they are fed through a banding mechanism of conventional embodiment (not illustrated) forming part of the single module 7, 8 and 9, by which at least one band 11 is applied to each stack of notes to form a bundle 2. As each bundle 2 is completed by an individual module, the system 6 will supply that same module with more notes, maintaining the sequence of code and serial number. Secured typically with a single band 11 positioned toward one end, the completed bundles 2 pass further along the formation channels 10 to the relative outlets 12, which are spaced apart at a predetermined pitch p1.

In the example of FIG. 1, bundles 2 emerging from the modules 7, 8 and 9 are taken up onto a conveyor 13 composed of two parallel belts 14 and 15 occupying a common plane and extending along a substantially horizontal first feed path P1, looped around respective pulleys 16 and 17 of which at least two, denoted 17 in the drawings, are driven by a motor 18. The belts 14 and 15 are separated one from the other by a predetermined distance so as to establish a gap 19, and interconnected by a plurality of transverse slats 20 serving to create a succession of pockets 21 distributed uniformly at a pitch denoted p2, each designed to accommodate a respective bundle 2.

The machine 1 comprises a master control unit 22 to which the operation of the motor 18 and the coupled pulleys 17 is interlocked in such a manner as to index the conveyor 13 along the first path P1 in a given direction D1 through steps p3 of which the length is a multiple of the pitch p2 selected for the pockets 21, thereby causing the bundles 2 to advance along the first path P1 in a predetermined succession and in a predetermined order that will depend on the order in which the single banknotes 3 are introduced initially into each of the bundling modules 7, 8 and 9.

The machine 1 further comprises orienting means denoted 23 in their entirety, located along the feed path P1 followed by the conveyor 13 and beyond the bundling modules 7, 8 and 9 in the conveying direction D1, by which the single bundles 2 can be rotated through 180° from the position assumed initially in the pockets 21 of the conveyor 13.

In the example of FIG. 1, orienting means 23 comprise three grippers 24 arranged in series along the feed path P1 and spaced apart one from the next by a distance T equal to the pitch p2 separating two successive pockets 21 of the conveyor 13. Each gripper 24 consists in a pair of mutually opposed gripping elements 25 and 26, and more precisely a bottom element 25 and a top element 26, disposed with axes 27 perpendicular to the first feed path P1 and occupying positions on opposite sides of the conveyor 13, of which the ends facing one another are equipped with respective pads 28 designed to enter into contact with a bundle 2 of notes.

The grippers 24 are power driven and interlocked singly to the master control unit 22 in such a way that each can be rotated about its own axis 27 and made to alternate between a non-operating position in which the two respective pads 28 are distanced one from another, allowing the bundles 2 to pass unhindered along the feed path P1 in the conveying direction D1, and an operating position in which the pads 28 are directed along the gripper axis 27 and through the gap 19 between the belts 14 and 15 to close on a bundle 2 of notes.

Also forming part of the machine 1 is a stacker 29, positioned at the outfeed end of the conveyor 13, which comprises a stacking channel 30 extending along a vertical stacking axis 31 and compassed by four vertical and mutually parallel bars 32 serving to restrain the bundles 2 laterally. The stacker 29 further comprises a companion element 33 embodied as a platform 34 serving to support and guide the bundles 2, which is capable of movement between a raised position substantially of alignment with the conveyor 13, at the mouth of the channel 30, and a lowered position coinciding substantially with the bottom of the channel 30, at a height determined by the number of bundles 2 making up one group 5. The finished group appears substantially parallelepiped in shape, presenting a top face, a bottom face, and four side faces parallel with the stacking axis 31.

The bottom of the channel 30 is positioned over a rail 35 disposed transversely to the feed path P1 and associated with a slide 36 carrying a pusher 37 by which the groups 5 or bundles 2 are transferred to a collection station 38.

Figure 2:
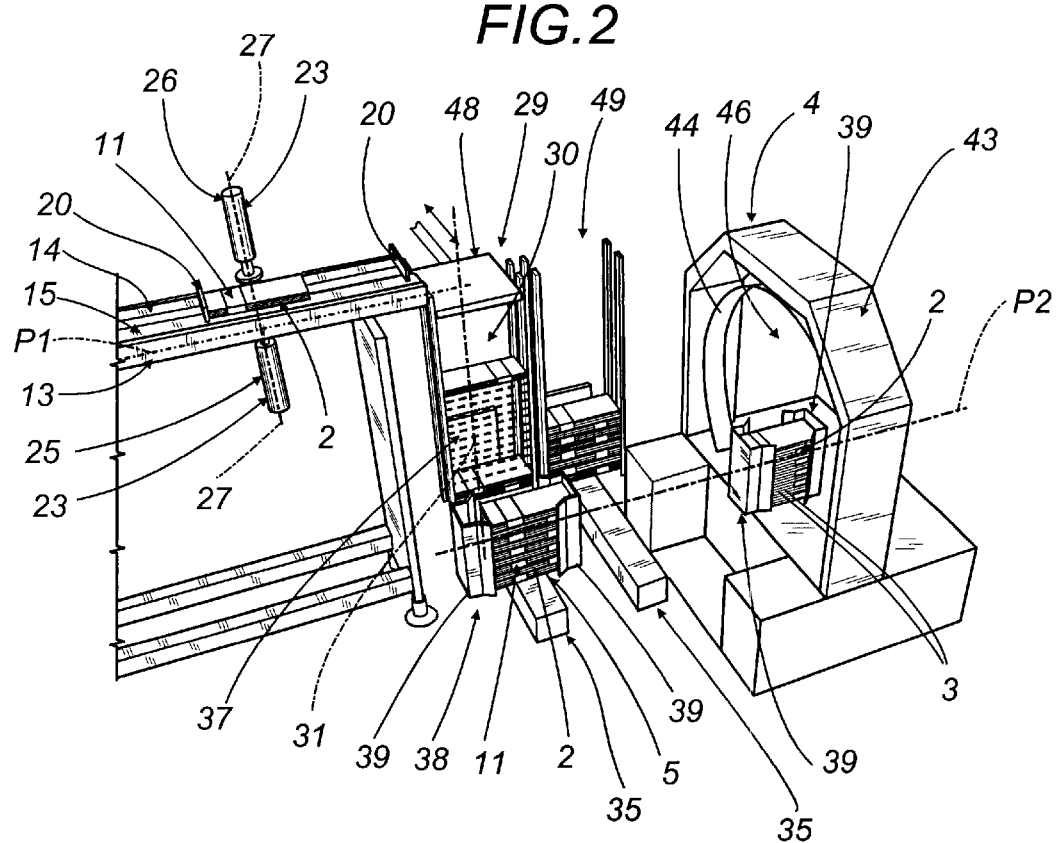
FIG. 2 illustrates an outfeed end of the machine in FIG. 1, seen schematically in perspective and in a different embodiment.
Figure 6:
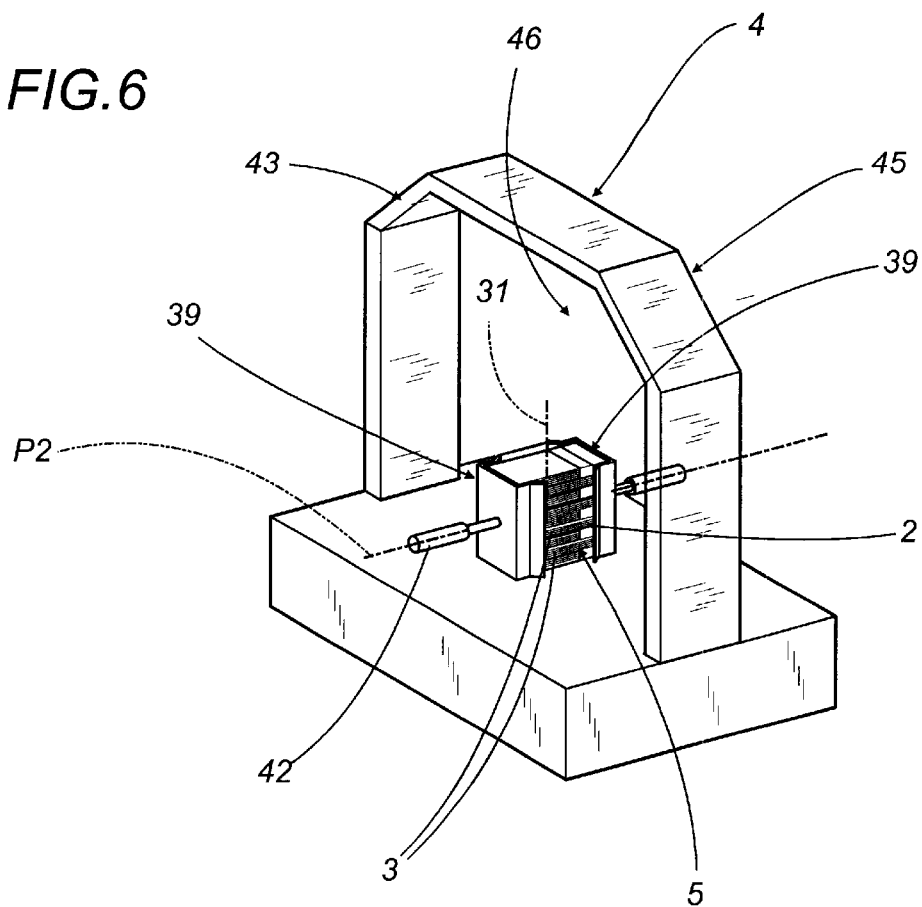
FIGS. 6 and 7 are fragments of FIGS. 1 and 2, viewed schematically in perspective and in greater detail.
Figure 7:
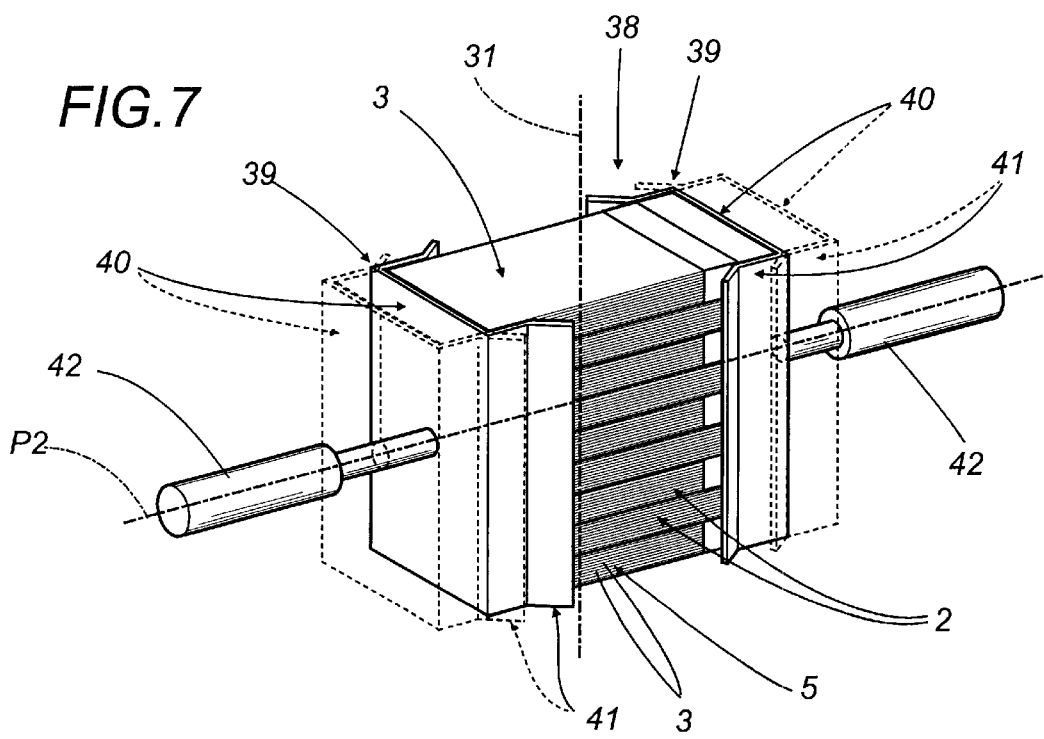

As illustrated to advantage in FIGS. 2, 6 and 7, the collection station 38 comprises a pair of mutually opposed gathering elements 39 positioned to engage respective end portions of the group 5 coinciding with two opposite side faces.

As discernible in FIG. 7, each such element 39 presents a profile of U shape, established by a frontal member 40 and two mutually opposed lateral members 41 with splayed free edges, and is capable of movement brought about by respective actuator means 42 between a spread position, in which the two elements 39 are distanced one from another as indicated in FIG. 7 by phantom lines, and a closed position, indicated by solid lines, in which a group 5 of bundles 2 is gripped and transferred to a strapper/bander station 43 where the group 5 will be secured with a strap 44.

The strapper/bander station 43 illustrated is of the type disclosed in application n° BO99A 000548 for Italian Patent, filed also in the name of the present applicant, to which reference may be made for a description. The relative unit will be seen to exhibit a gantry type structure 45 affording a passage 46 by which the station 43 is compassed in its entirety.

In operation, when three bundles 2 are secured with relative bands 11 and placed at the outlets 12 of the three modules 7, 8 and 9, the conveyor 13 will have been indexed along the first feed path P1 by the motor 18 in response to a signal from the master control unit 22 and brought to a halt with three empty pockets 21 in transverse alignment with the three outlets 12 of the modules 7, 8 and 9. It will be evident therefore that the pitch p1 of the outlets 12 is identical to the pitch p2 of the pockets 21.

Once the bundles 2 are in the pockets 21, three signals are relayed to the control unit 22 by three proximity sensors 47 occupying respective positions along the conveyor 13 adjacent to the positions assumed by the three pockets 21 during the previous pause, whereupon the motor 18 is piloted to index the conveyor 13 through a step p3 three times the pitch p2 of the pockets 21 in such a way that three more empty pockets 21 are placed to receive three further bundles 2 from the modules 7, 8, and 9, and the three bundles 2 taken up during the previous pause are brought into alignment with the orienting means 23, which will come into operation during the next pause of the conveyor 13. The need for such orienting means 23 is dictated by the off-center positioning of the bands 11 around the bundles 2: in effect, if all bundles 2 of a group 5 were to be positioned with the band 11 at the same end, the resulting block would be higher at one end than the other, hence unstable, and stacking would be made difficult.

To prevent such a situation from arising, the master control unit 22 will be programmed, perhaps utilizing an input signal from proximity sensors 47 that are capable also of verifying the position of the band 11 on each successive bundle 2, to pilot the operation of the grippers 24 on the basis of a set logic in such a way that the orientation of the bundles can be reversed selectively and the single successive bundles 2 positioned with the relative bands 11 alternately to one side of center and the other on arrival at the runout of the conveyor 13.

More exactly, it is not in fact essential that each single bundle 2 be oriented oppositely to the bundles preceding and following; the orientation might equally well be changed every two bundles, for example, or in any other convenient sequence. It is important only that the groups 5 should be of substantially parallelepiped geometry and regular height.

Following the action of the orienting means 23, the bundles 2 are directed from the conveyor 13 to the channel 30 of the stacker 29 in a predetermined succession, one being placed on top of the next on the platform 34 of the companion element 33 in such a way that the predetermined succession established along the conveyor 13 is maintained unchanged in the accumulating group 5.

Each time the conveyor 13 indexes accordingly, three bundles 2 are transferred to the stacker 29, and this continues until the group 5 is completed. At this point, after the group has been transferred by the pusher 37 toward the collection station 38 and the companion element 33 vacated, the selfsame companion element returns to the raised position of alignment with the outfeed end of the conveyor 13, ready to admit a further succession of bundles 2. The cycle is repeated for each group 5.

In the event that the number of bundles 2 making up the single group 5 happens not to be a multiple of the number of bundles 2 advanced with the single step indexed by the conveyor 13, the machine 1 will comprise a table 48 located at the runout of the conveyor 13, between the outfeed end and the mouth of the channel 30 afforded by the stacker 29. The table 48 is disposed parallel to the platform 34 of the companion element 33 and capable of assuming a non-operating position outside the compass of the channel 30, also an operating position in which the passage to the stacking channel 30 is blocked and the bundles 2 surplus to requirements are retained temporarily on the table.

Figure 3:
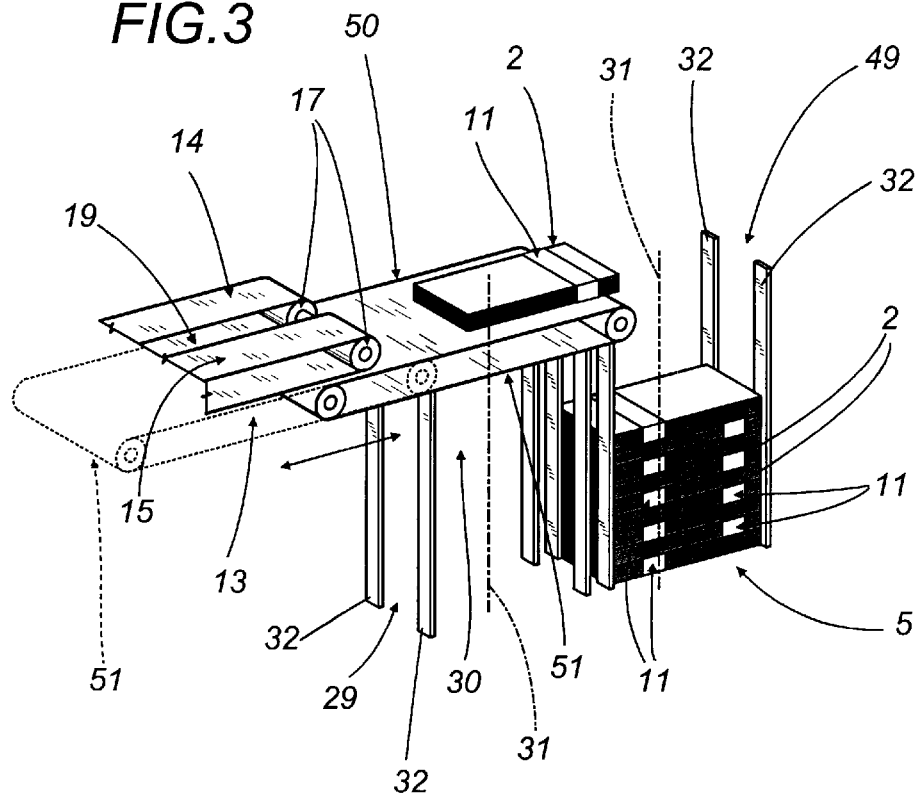
FIG. 3 is a detail of FIG. 2, illustrated schematically in perspective and in a first embodiment.
Figure 4:
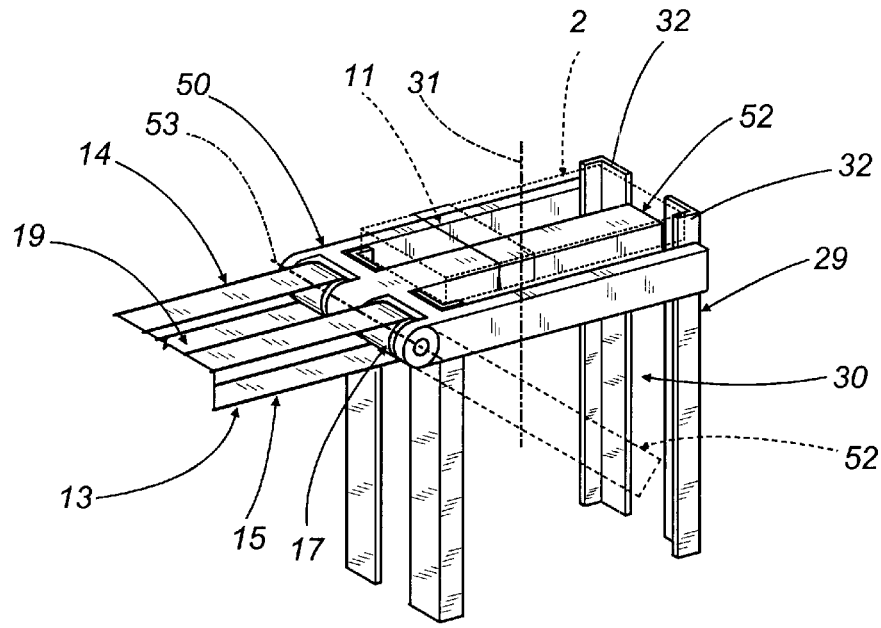
FIG. 4 is a detail of FIG. 3, illustrated schematically in perspective and in an alternative embodiment.

Referring to FIGS. 2, 3 and 4, the machine 1 may be required to process two or more types of banknotes 3 differing in size and/or denomination; in this instance there will be a second stacker 49 at the outfeed end of the conveyor 13, identical in embodiment to the first stacker 29, to which the bundles 2 are supplied by connection and transfer means denoted 50. When in operation, the means 50 in question will be positioned so as to bridge the space above the channel 30 of the stacker 29.

In the case of FIG. 3, connection and transfer means 50 comprise a second conveyor 51 arranged in series with and below the runout of the conveyor 13, described above, capable thus of movement between a retracted position, as considered in relation to the aforementioned conveying direction D1, in which the mouth of the channel 30 afforded by the first stacker 29 is vacated, and an operating position in which the mouth of the channel 30 is closed and the bundles are directed toward the second stacker 49.

Likewise in the example of FIG. 4, connection and transfer means 50 comprise a chute 52 arranged in series with the conveyor 13 and hinged about an axis extending parallel to the axis of rotation of the pulleys 17. The chute 52 consists in a set of prongs and is rotatable between a lowered position, indicated by phantom lines in FIG. 4, in which the mouth of the stacking channel 30 is vacated, and a raised operating position in which the mouth of the channel 30 is closed and the bundles are caused to drop into the second stacker 49.

Figure 5:
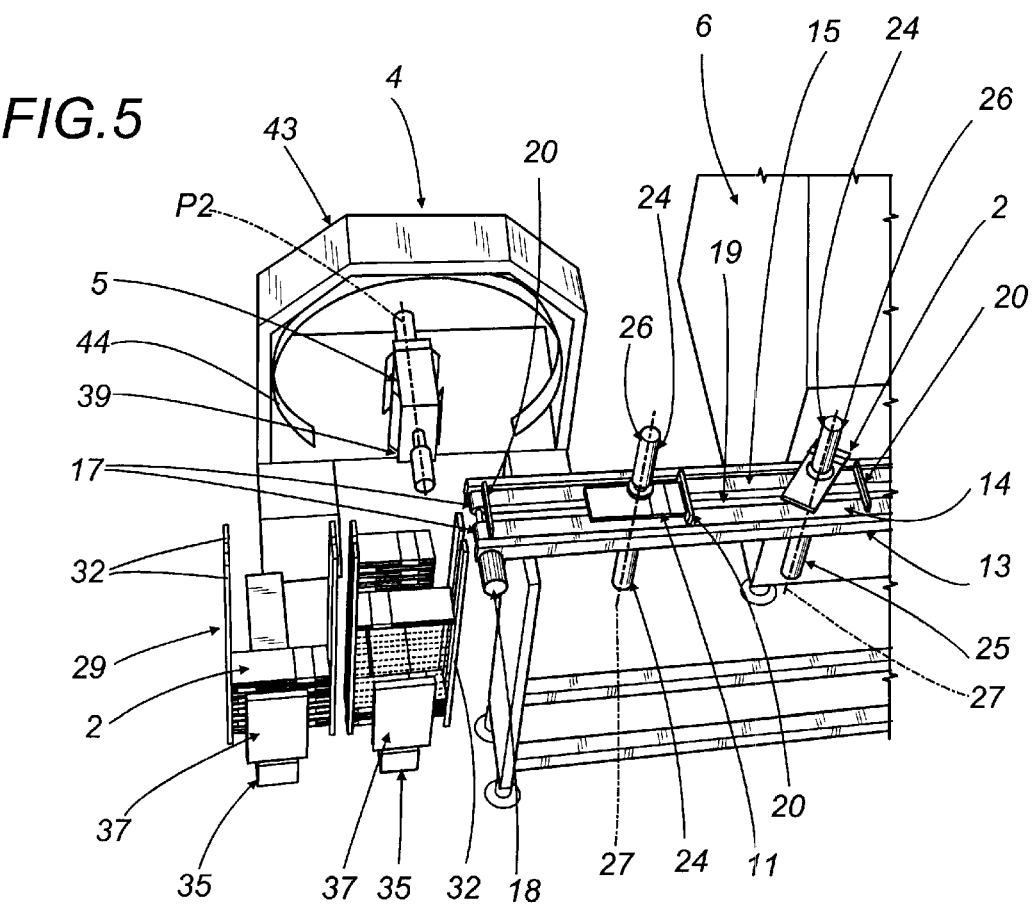
FIG. 5 shows the outfeed end of the machine of FIG. 1, illustrated schematically in perspective and in a further embodiment.

As discernible also from FIGS. 1, 2 and 5, the strapper/bander unit 4 can be positioned in line with the conveyor 13, or set at right angles as in FIG. 5.

Similarly, the path P2 followed by the gathering elements 39 when taking up the groups 5 can extend in line with or parallel to the first feed path P1 followed by the conveyor 13, or transverse to the selfsame path P1.

What is claimed is:

1. A machine for ordering and feeding bundles of sheets, in particular banknotes, to a unit by which the bundles are strapped in groups, comprising:
    at least one module for the formation of bundles, each comprised of a predetermined number of banknotes secured by at least one band;
    a receiving conveyor by which bundles emerging from the module are fed in a predetermined succession toward a stacker located at an outfeed end of the conveyor and serving to place a predetermined number of bundles one on top of another in such a manner as to assemble respective groups in which the predetermined succession is maintained as the bundles advance along a respective stacking axis; and
    a strapper/bander unit of which the function is to place a strap around a group of bundles emerging from the stacker and appearing substantially parallelepiped in shape, presenting a top face, a bottom face and four side faces, wherein the unit comprises collection and transfer means consisting in a pair of elements positioned to gather respective end portions of the group coinciding with two mutually opposite side faces, and capable of movement along a second feed path through a strapper/bander station located downline of the stackers.

2. A machine as in claim 1, comprising a plurality of modules for the formation of bundles which are directed onto an intermittently driven conveyor affording a plurality of pockets each accommodating a single bundle and operating in conjunction with the modules in such a manner as to maintain the predetermined succession of the bundles according to a previously established sequence.

3. A machine as in claim 2, wherein the pockets of the conveyor are equispaced at a pitch corresponding to the pitch of the respective outlets of the modules, and indexed through a step corresponding to a multiple of the pitch of the pockets and determined by the number of modules.

4. A machine as recited in claim 1, wherein the band is positioned adjacent to an end portion of the single bundle and the conveyor is associated with orienting means of which the function is to rotate the bundles through 180° from the position assumed when taken up initially by the conveyor, and of which the activation is selectable according to a previously established sequence.

5. A machine as in claim 4, wherein orienting means comprise at least one gripper embodied as a pair of mutually opposed gripping elements disposed on opposite sides of the conveyor and capable of movement along an axis normal to the conveyor between a non-operating position, distanced one from another, and an operating position, assumed during a pause in the movement of the conveyor, in which the two elements are drawn together through the gap to grip a bundle and free thus to rotate about the axis to the end of bringing about the rotation of the bundle.

6. A machine as in claim 1, wherein the conveyor comprises a pair of belts set apart one from the other by a selected distance to define a gap, looped around respective pairs of pulleys, and interconnected by a plurality of transverse slats positioned to separate the single pockets one from the next.

7. A machine as in claim 1, wherein the stacker occupies a position below the outfeed end of the conveyor and comprises a stacking channel equipped with a companion element capable of movement along the stacking axis between a raised position of readiness to receive the first bundle of the predetermined succession making up the group, and a lowered position in which the group is completed.

8. A machine as in claim 1, comprising a second stacker located in close proximity to the outfeed end of the conveyor, equipped with connection and transfer means along which the bundles are directed toward the second stacker.

9. A machine as in claim 8, wherein the connection and transfer means, when brought into operation, are positioned in such a way as to bridge the first stacker.

10. A machine as in claim 9, wherein connection and transfer means comprise a second conveyor disposed in series with the first conveyor, capable of movement between a non-operating position distanced from the mouth of the first stacker and an operating position in which bundles are fed to the second stacker.

11. A machine as in claim 9, wherein connection and transfer means comprise a chute disposed in series with the conveyor, pivotable about an axis disposed parallel to the axis of rotation of the pulleys of the first conveyor and made to oscillate between a non-operating position in which the mouth of the first stacker is vacated, and an operating position in which the bundles are gravity fed to the second stacker.

12. A machine as in claim 1, wherein the second feed path extends in line with the conveyor.

13. A machine as in claim 1, wherein the second feed path extends transversely relative to the conveyor.

14. A machine as in claim 1, wherein the strapper/bander station comprises a frame of gantry-like embodiment and the second feed path followed by the means for collection and transfer of the groups of bundles passes through the frame.

* * * * *